United States Patent
Emura

(10) Patent No.: US 10,297,114 B2
(45) Date of Patent: May 21, 2019

(54) BETTING TICKET INFORMATION PROVISION DEVICE, BETTING TICKET INFORMATION PROVISION METHOD, AND PROGRAM FOR BETTING TICKET INFORMATION PROVISION DEVICE

(71) Applicant: Rakuten, Inc., Tokyo (JP)

(72) Inventor: Sadaaki Emura, Setagaya-ku (JP)

(73) Assignee: Rakuten, Inc., Tokyo (JP)

( * ) Notice: Subject to any disclaimer, the term of this patent is extended or adjusted under 35 U.S.C. 154(b) by 129 days.

(21) Appl. No.: 15/303,296

(22) PCT Filed: Sep. 30, 2014

(86) PCT No.: PCT/JP2014/076107
§ 371 (c)(1),
(2) Date: Oct. 11, 2016

(87) PCT Pub. No.: WO2016/051513
PCT Pub. Date: Apr. 7, 2016

(65) Prior Publication Data
US 2017/0032621 A1 Feb. 2, 2017

(51) Int. Cl.
*G06Q 30/06* (2012.01)
*G06Q 50/34* (2012.01)
*G07F 17/32* (2006.01)

(52) U.S. Cl.
CPC ......... *G07F 17/3288* (2013.01); *G06Q 30/06* (2013.01); *G06Q 50/34* (2013.01); *G07F 17/323* (2013.01); *G07F 17/3244* (2013.01)

(58) Field of Classification Search
None
See application file for complete search history.

(56) References Cited

U.S. PATENT DOCUMENTS 7,454,380 B2 * 11/2008 Garahi ............... G06Q 10/063
463/16
7,477,954 B2 * 1/2009 LaNeve ............. G06Q 50/34
700/91

(Continued)

FOREIGN PATENT DOCUMENTS

JP 3-189764 A 8/1991
JP 2006-155574 A 6/2006

OTHER PUBLICATIONS

International Search Report for PCT/JP2014/076107 dated Dec. 22, 2014 [PCT/ISA/210].

*Primary Examiner* — James S. McClellan
*Assistant Examiner* — Peter J Iannuzzi
(74) *Attorney, Agent, or Firm* — Sughrue Mion, PLLC

(57) ABSTRACT

After purchase a betting ticket, odds fluctuate as time goes by and the predicted payout amount of part of buying targets becomes lower than the total purchase amount, causing unexpected loss for the ticket holders. Systems and methods acquire odds information about a race, a betting type of a betting ticket for designating one or more racers out of racers to participate in a race of the racing and a buying target in the betting type. Additionally, an acceptance amount for each buying target is accepted from a user, and notification information is output when at least one predicted payout amount out of each predicted payout amount calculated from each acceptance amount for each buying target of a betting type of a betting ticket accepted from the user and the acquired odds information is less than a reference amount based on a total acceptance amount accepted from the user.

8 Claims, 18 Drawing Sheets

(56) References Cited

U.S. PATENT DOCUMENTS

| | | | | |
|---|---|---|---|---|
| 7,950,990 B2* | 5/2011 | Marshall | ............... | G06Q 50/34 463/6 |
| 8,210,926 B2* | 7/2012 | Asher | ................... | G06Q 40/04 463/25 |
| 8,292,729 B2* | 10/2012 | Vlazny | ............... | G07F 17/3288 463/25 |
| 2003/0008711 A1* | 1/2003 | Corbo | ..................... | G07F 17/32 463/42 |
| 2013/0045794 A1* | 2/2013 | Vlazny | .................. | G07F 17/32 463/25 |
| 2015/0105142 A1* | 4/2015 | Amaitis | ............. | G07F 17/3288 463/25 |

* cited by examiner

| USER ID | RACE ID | BETTING TYPE | BUYING TARGET | PURCHASE AMOUNT | ODDS AT TIME OF PURCHASE |
|---|---|---|---|---|---|
| 00111 | 3210123 | EXACTA |  | ¥1,000 | 3.0 |
| 00111 | 3210123 | EXACTA | 2-1 | ¥700 | 5.0 |
| 00111 | 3210123 | EXACTA | 1-3 | ¥400 | 8.0 |
| 00111 | 3210123 | EXACTA | 3-1 | ¥300 | 12.0 |
| ... | | | | | |
| 00111 | 3210123 | WIN | 1 | ¥500 | 3.5 |
| ... | | | | | |
| 00113 | 3210123 | WIN | 1 | ¥700 | 3.4 |
| ... | | | | | |

FIG.3

△○▽HORSE RACING     HELLO Mr. A!

| RACE PROGRESS STATUS | ENTRY | ODDS | RESULT | PAYOUT |   (DEPOSIT)

7 R  2014/9/9  ●△RACECOURSE · · ·
DIRT 1,800m  SUNNY、MUD、START TIME 15:55

QUINELLA

| BUYING TARGET | PURCHASE AMOUNT | CURRENT ODDS | PREDICTED PAYOUT AMOUNT |
|---|---|---|---|
| 1-2 | ¥500 | 3.0 | ¥1,500 |
| 1-3 | ¥200 | 8.0 | ¥1,600 |
| 2-3 | ¥100 | 15.0 | ¥1,500 |

TOTAL : ¥800

FIG.6

| BETTING TYPE | BUYING TARGET | ODDS AT TIME OF PURCHASE | PURCHASE AMOUNT | PREDICTED PAYOUT AMOUNT |
|---|---|---|---|---|
| QUINELLA | 1-2 | 3.0 | ¥500 | ¥1,500 |
| QUINELLA | 1-3 | 8.0 | ¥200 | ¥1,600 |
| QUINELLA | 2-3 | 15.0 | ¥100 | ¥1,500 |

FIG.9

| BETTING TYPE | BUYING TARGET | ODDS AFTER PURCHASE | PURCHASE AMOUNT | PREDICTED PAYOUT AMOUNT |
|---|---|---|---|---|
| QUINELLA | 1-2 | 1.5 | ¥500 | ¥750 |
| QUINELLA | 1-3 | 8.0 | ¥200 | ¥1,600 |
| QUINELLA | 2-3 | 15.0 | ¥100 | ¥1,500 |

FIG.10

| BETTING TYPE | BUYING TARGET | ODDS AT TIME OF PURCHASE | PURCHASE AMOUNT | PREDICTED PAYOUT AMOUNT | COMBINED SUM OF PREDICTED PAYOUT AMOUNTS |
|---|---|---|---|---|---|
| EXACTA | 1-2 | 3.0 | ¥1,000 | ¥3,000 | ¥4,750 |
| EXACTA | 2-1 | 5.0 | ¥700 | ¥3,500 | |
| EXACTA | 1-3 | 8.0 | ¥400 | ¥3,200 | ¥4,950 |
| EXACTA | 3-1 | 12.0 | ¥300 | ¥3,600 | |
| EXACTA | 2-3 | 18.0 | ¥200 | ¥3,600 | |
| EXACTA | 3-2 | 25.0 | ¥200 | ¥5,000 | |

SUBTOTAL : ¥2,800

| | | | | | |
|---|---|---|---|---|---|
| WIN | 1 | 3.5 | ¥500 | ¥1,750 | |

TOTAL : ¥3,300

FIG.11

| BETTING TYPE | BUYING TARGET | ODDS AFTER PURCHASE | PURCHASE AMOUNT | PREDICTED PAYOUT AMOUNT | COMBINED SUM OF PREDICTED PAYOUT AMOUNTS |
|---|---|---|---|---|---|
| EXACTA | 1-2 | 1.8 | ¥1,000 | ¥1,800 | ¥3,050 |
| EXACTA | 2-1 | 5.0 | ¥700 | ¥3,500 | |
| EXACTA | 1-3 | 8.0 | ¥400 | ¥3,200 | ¥4,450 |
| EXACTA | 3-1 | 12.0 | ¥300 | ¥3,600 | |
| EXACTA | 2-3 | 18.0 | ¥200 | ¥3,600 | |
| EXACTA | 3-2 | 25.0 | ¥200 | ¥5,000 | |
| | | | SUBTOTAL : ¥2,800 | | |
| WIN | 1 | 2.5 | ¥500 | ¥1,250 | |
| | | | TOTAL : ¥3,300 | | |

FIG. 12

| BETTING TYPE | BUYING TARGET | ODDS AFTER PURCHASE | PURCHASE AMOUNT | PREDICTED PAYOUT AMOUNT | COMBINED SUM OF PREDICTED PAYOUT AMOUNTS |
|---|---|---|---|---|---|
| EXACTA | 1-2 | 1.5 | ¥1,000 | ¥1,500 | ¥2,750 |
| EXACTA | 2-1 | 5.0 | ¥700 | ¥3,500 | |
| EXACTA | 1-3 | 4.0 | ¥400 | ¥1,600 | ¥2,850 |
| EXACTA | 3-1 | 12.0 | ¥300 | ¥3,600 | |
| EXACTA | 2-3 | 18.0 | ¥200 | ¥3,600 | |
| EXACTA | 3-2 | 25.0 | ¥200 | ¥5,000 | |

SUBTOTAL : ¥2,800

| | | | | | |
|---|---|---|---|---|---|
| WIN | 1 | 2.5 | ¥500 | ¥1,250 | |

TOTAL : ¥3,300

FIG.13

| WIN ODDS | WIN PURCHASE AMOUNT | WIN PREDICTED PAYOUT AMOUN | EXACTA 1-2 PREDICTED PAYOUT AMOUNT | COMBINED SUM OF PREDICTED PAYOUT AMOUNTS | EXACTA TOTAL PURCHASE AMOUNT | TOTAL PURCHASE AMOUNT |
|---|---|---|---|---|---|---|
| 2.5 | ¥500 | ¥1,250 | ¥1,500 | ¥2,750 | ¥2,800 | ¥3,300 |
| 2.5 | ¥600 | ¥1,500 | ¥1,500 | ¥3,000 | ¥2,800 | ¥3,400 |
| 2.5 | ¥700 | ¥1,750 | ¥1,500 | ¥3,250 | ¥2,800 | ¥3,500 |
| 2.5 | ¥800 | ¥2,000 | ¥1,500 | ¥3,500 | ¥2,800 | ¥3,600 |
| 2.5 | ¥900 | ¥2,250 | ¥1,500 | ¥3,750 | ¥2,800 | ¥3,700 |

FIG.14

| WIN ODDS | WIN PURCHASE AMOUNT | WIN PREDICTED PAYOUT AMOUNT | EXACTA 1-3 PREDICTED PAYOUT AMOUNT | COMBINED SUM OF PREDICTED PAYOUT AMOUNTS | EXACTA TOTAL PURCHASE AMOUNT | TOTAL PURCHASE AMOUNT |
|---|---|---|---|---|---|---|
| 2.5 | ¥500 | ¥1,250 | ¥1,600 | ¥2,850 | ¥2,800 | ¥3,300 |
| 2.5 | ¥600 | ¥1,500 | ¥1,600 | ¥3,100 | ¥2,800 | ¥3,400 |
| 2.5 | ¥700 | ¥1,750 | ¥1,600 | ¥3,350 | ¥2,800 | ¥3,500 |
| 2.5 | ¥800 | ¥2,000 | ¥1,600 | ¥3,600 | ¥2,800 | ¥3,600 |
| 2.5 | ¥900 | ¥2,250 | ¥1,600 | ¥3,850 | ¥2,800 | ¥3,700 |

FIG.15

| WIN ODDS | WIN PURCHASE AMOUNT | WIN PREDICTED PAYOUT AMOUNT | EXACTA 1-2 PREDICTED PAYOUT AMOUNT | COMBINED SUM OF PREDICTED PAYOUT AMOUNTS | EXACTA TOTAL PURCHASE AMOUNT | TOTAL PURCHASE AMOUNT |
|---|---|---|---|---|---|---|
| 2.5 | ¥500 | ¥1,250 | ¥1,500 | ¥2,750 | ¥3,100 | ¥3,600 |
| 2.5 | ¥600 | ¥1,500 | ¥1,500 | ¥3,000 | ¥3,100 | ¥3,700 |
| 2.5 | ¥700 | ¥1,750 | ¥1,500 | ¥3,250 | ¥3,100 | ¥3,800 |
| 2.5 | ¥800 | ¥2,000 | ¥1,500 | ¥3,500 | ¥3,100 | ¥3,900 |
| 2.5 | ¥900 | ¥2,250 | ¥1,500 | ¥3,750 | ¥3,100 | ¥4,000 |
| 2.5 | ¥1,000 | ¥2,500 | ¥1,500 | ¥4,000 | ¥3,100 | ¥4,100 |
| 2.5 | ¥1,100 | ¥2,750 | ¥1,500 | ¥4,250 | ¥3,100 | ¥4,200 |

FIG.16

△○▽HORSE RACING　　　　　　　　　　HELLO Mr.A!

| RACE PROGRESS STATUS | ENTRY | ODDS | RESULT | PAYOUT | | DEPOSIT |

41

NOTIFICATION THERE IS BUYING TARGET WHERE PREDICTED PAYOUT AMOUNT FALLS.

7R 2014/9/9 ●△RACECOURSE ・・・
DIRT1,800m SUNNY、MUD、START TIME15：55

QUINELLA

| BUYING TARGET | PURCHASE AMOUNT | CURRENT ODDS | PREDICTED PAYOUT AMOUNT |
|---|---|---|---|
| 1-2 | ¥500 | 1.5 | ¥750 |
| 1-3 | ¥200 | 8.0 | ¥1,600 |
| 2-3 | ¥100 | 15.0 | ¥1,500 |

TOTAL：¥800

42

IF QUINELLA 1-2 IS ADDITIONALLY PURCHASED FOR ¥200, PREDICTED PAYOUT AMOUNT REACHES ¥1,050, AND EXCEEDS TOTAL PURCHASE AMOUNT ¥1,000.

45

[ADDITIONAL PURCHASE]

FIG.17

△○▽HORSE RACING　　　　　　　　　　　　　　HELLO Mr. A!

| RACE PROGRESS STATUS | ENTRY | ODDS | RESULT | PAYOUT |   | DEPOSIT |

NOTIFICATION THERE IS BUYING TARGET WHERE PREDICTED PAYOUT AMOUNT FALLS. — 41

7R 2014/9/9 ●△RACECOURSE ・・・
DIRT1,800m SUNNY、MUD、START TIME15 : 55

EXACTA

| BUYING TARGET | PURCHASE AMOUNT | CURRENT ODDS | PREDICTED PAYOUT AMOUNT | COMBINED SUM OF PREDICTED PAYOUT AMOUNTS |
|---|---|---|---|---|
| 1-2 | ¥1,000 | 1.8 | ¥1,800 | ¥3,050 |
| 2-1 | ¥700 | 5.0 | ¥3,500 |  |
| 1-3 | ¥400 | 8.0 | ¥1,600 | ¥4,450 |
| 3-1 | ¥300 | 12.0 | ¥3,600 |  |
| 2-3 | ¥200 | 18.0 | ¥3,600 |  |
| 3-2 | ¥200 | 25.0 | ¥5,000 |  |

SUBTOTAL : ¥2,800

WIN

| 1 | ¥500 | 2.5 | ¥1,250 |

TOTAL : ¥3,300

IF WIN 1 IS ADDITIONALLY PURCHASED FOR ¥200,
LOWEST PREDICTED PAYOUT AMOUNT REACHES ¥3,550,
AND EXCEEDS TOTAL PURCHASE AMOUNT ¥3,500.

[ADDITIONAL PURCHASE]

FIG.18

NOTIFICATION THERE IS BUYING TARGET WHERE PREDICTED PAYOUT AMOUNT FALLS.

7 R 2014/9/9 ●△RACECOURSE · · ·
DIRT 1,800m SUNNY、MUD、START TIME 15:55

EXACTA

| BUYING TARGET | PURCHASE AMOUNT | CURRENT ODDS | PREDICTED PAYOUT AMOUNT | COMBINED SUM OF PREDICTED PAYOUT AMOUNTS |
|---|---|---|---|---|
| 1-2 | ¥1,000 | 1.5 | ¥1,500 | ¥2,750 |
| 2-1 | ¥700 | 5.0 | ¥3,500 | |
| 1-3 | ¥400 | 4.0 | ¥1,600 | ¥2,850 |
| 3-1 | ¥300 | 12.0 | ¥3,600 | |
| 2-3 | ¥200 | 18.0 | ¥3,600 | |
| 3-2 | ¥200 | 25.0 | ¥5,000 | |

SUBTOTAL : ¥2,800

WIN

| 1 | ¥500 | 2.5 | ¥1,250 |
|---|---|---|---|

TOTAL : ¥3,300

---

IF WIN 1 IS ADDITIONALLY PURCHASED FOR ¥400,
LOWEST PREDICTED PAYOUT AMOUNT REACHES ¥3,750,
AND EXCEEDS TOTAL PURCHASE AMOUNT ¥3,700.

---

HOWEVER, EXACTA 2-1 DECREASES BY ¥200,
EXACTA 3-1 DECREASES BY ¥100, AND EXACTA 2-3
DECREASES BY ¥100.
DO YOU ALLOW DISADVANTAGE,
AND PERFORM ADDITIONAL PURCHASE?

ADDITIONAL PURCHASE BY ALLOWING DISADVANTAGE

---

IF WIN 1 IS ADDITIONALLY PURCHASED FOR ¥600,
AND EACH OF EXACTA 2-1, EXACTA 3-1, AND EXACTA
2-3 IS ADDITIONALLY PURCHASED FOR ¥100,
LOWEST PREDICTED PAYOUT AMOUNT EXCEEDS TOTAL
PURCHASE AMOUNT ¥4,200.

ADDITIONAL PURCHASE

FIG.19

BETTING TICKET INFORMATION PROVISION DEVICE, BETTING TICKET INFORMATION PROVISION METHOD, AND PROGRAM FOR BETTING TICKET INFORMATION PROVISION DEVICE

CROSS REFERENCE TO RELATED APPLICATIONS

This application is a National Stage of International Application No. PCT/JP2014/076107, filed on Sep. 30, 2014, the contents of all of which are incorporated herein by reference in their entirety.

TECHNICAL FIELD

The present invention relates to the technical fields of betting ticket information provision devices, betting ticket information provision methods, and programs for the betting ticket information provision devices that provide information on betting tickets for racing.

BACKGROUND ART

Regarding the purchase of a betting ticket of a racing such as a horse racing and a bicycle racing, in the race of the racing, there is a betting ticket purchase method for making the predicted payout amount higher than the total purchase amount, whatever buying target is hit. For example, Patent Document 1 discloses that the bet is allocated so that the payout of the bet of the buying target is the same in any bet.

CITATION LIST

Patent Document

Patent Document 1: JP 2006-155574 A.

SUMMARY OF THE INVENTION

Problem to be Solved by the Invention

By the way, there has sometimes been a case where after purchase of a betting ticket, when the odds fluctuate as time goes by, the predicted payout amount of part of buying targets becomes lower than the total purchase amount, which causes unexpected loss for users.

The present invention has been made in view of such problems, and an example of the object is to provide betting ticket information for preventing unexpected loss for users.

Means for Solving the Problem

In order to solve the above problems, the invention according to an embodiment is characterized in that a betting ticket information provision device that provides information about a betting ticket of a racing includes: an odds information acquisition means that acquires odds information about a race of the racing; an acceptance means that accepts from a user a betting type of a betting ticket for designating one or more racers out of racers to participate in a race of the racing, a buying target in the betting type, and an acceptance amount for each buying target; and an output means that outputs information to be notified to the user when at least one predicted payout amount out of each predicted payout amount calculated from each acceptance amount for each buying target of a betting type of a betting ticket accepted from the user and the acquired odds information is less than a reference amount based on a total acceptance amount accepted from the user.

Therefore, when the odds fall after the purchase of the betting ticket, and the predicted payout amount is less than the reference amount, the information to be notified to the user is output, and therefore the unexpected loss to the user can be prevented.

The invention according to an embodiment is characterized in that a betting type and a buying target to have the predicted payout amount less than the reference amount are specified, and information about the specified betting type and buying target is output.

In this case, it is found which predicted payout amount of a buying target of a betting type is less than the reference amount, and the unexpected loss to the user can be prevented.

The invention according to an embodiment is characterized in that a betting type and a buying target to have the predicted payout amount less than the reference amount are specified, and the betting type, buying target, and an additional purchase amount where a predicted payout amount of when a betting ticket indicated by the specified betting type and buying target is additionally purchased reaches the reference amount added with the additional purchase amount or more, are included in the information to be notified to the user to be output.

In this case, the user can be advised to reduce the unexpected loss by the additional purchase. In addition, the betting type and the buying target to have the predicted payout amount less than the reference amount are specified, then the additional purchase amount is determined, and therefore the additional purchase amount can be efficiently determined.

The invention according to an embodiment is characterized in that a betting type and a buying target to have the predicted payout amount less than the reference amount are specified, an additional purchase is repeated until a predicted payout amount of when a betting ticket indicated by the specified betting type and buying target is additionally purchased for a purchase unit amount of the betting ticket reaches the reference amount added with the additional purchase amount or more, and the betting type, the buying target, and the additional purchase amount as a result of the repetition are included in the information to be notified to the user to be output.

In this case, the user can be advised to reduce the unexpected loss by the additional purchase. In addition, the betting type and the buying target to have the predicted payout amount less than the reference amount are specified, then the additional purchase amount is sequentially determined by the purchase unit amount's worth of additional purchase, and therefore the additional purchase amount can be easily and efficiently determined.

The invention according to an embodiment is characterized in that only a betting type and a buying target to have the predicted payout amount less than the reference amount are specified.

In this case, the targets to be additionally purchased are narrowed down to only the betting type and the buying target to have the predicted payout amount less than the reference amount, whereby the buying target to be additionally purchased can be effectively searched.

The invention according to an embodiment is characterized in that the reference amount added with the additional purchase amount is calculated from an addition amount of the sum of the acceptance amounts and an amount obtained by multiplying the number of buying targets to have the predicted payout amount less than the reference amount in the betting type by a purchase unit amount of the betting ticket, and the buying target to be additionally purchased is specified from buying targets to have the predicted payout amount less than the reference amount added with the additional purchase amount.

In this case, the targets to be additionally purchased are narrowed down, whereby the buying target to be additionally purchased can be effectively searched.

The invention according to an embodiment is characterized in that when there are two or more types of the betting types accepted from the user, the betting type to be additionally purchased is specified depending on a comparison between odds information in one type of betting type and odds information in another type of betting type out of types of the betting types.

In this case, the betting type to be additionally purchased can be effectively narrowed down.

The invention according to an embodiment is characterized in that a reference amount obtained from the sum of the acceptance amounts is an amount less than the sum of the acceptance amounts by an allowable maximum amount.

In this case, the additional purchase amount can be reduced.

The invention according to an embodiment is characterized in that the allowable maximum amount is set by user information of the user.

In this case, the allowable maximum amount adapted to each user can be set depending on the user.

The invention according to an embodiment is characterized in that a betting ticket information provision method of a betting ticket information provision device that provides information about a betting ticket of a racing includes: an odds information acquisition step of acquiring odds information about a race of the racing; an acceptance step of accepting from a user a betting type of a betting ticket for designating one or more racers out of racers to participate in a race of the racing, a buying target in the betting type, and an acceptance amount for each buying target; and an output step of outputting information to be notified to the user when at least one predicted payout amount out of each predicted payout amount calculated from each acceptance amount for each buying target of a betting type of a betting ticket accepted from the user and the acquired odds information is less than a reference amount based on a total acceptance amount accepted from the user.

The invention according to an embodiment is characterized in that a program for a betting ticket information provision device that provides information about a betting ticket of a racing causes a computer to function as: an odds information acquisition means that acquires odds information about a race of the racing; an acceptance means that accepts from a user a betting type of a betting ticket for designating one or more racers out of racers to participate in a race of the racing, a buying target in the betting type, and an acceptance amount for each buying target; and an output means that outputs information to be notified to the user when at least one predicted payout amount out of each predicted payout amount calculated from each acceptance amount for each buying target of a betting type of a betting ticket accepted from the user and the acquired odds information is less than a reference amount based on a total acceptance amount accepted from the user.

Effect of the Invention

According to the present invention, when the odds fall after the purchase of the betting ticket, and the predicted payout amount is less than the reference amount, the information to be notified to the user is output, and therefore the unexpected loss to the user can be prevented.

BRIEF DESCRIPTION OF THE DRAWINGS

FIG. 3 is a schematic diagram illustrating an example of a purchase betting ticket database of the betting ticket information provision server in FIG. 2.

FIG. 6 is a schematic diagram illustrating an example of a display of the terminal device in FIG. 1.

FIG. 9 is a schematic diagram illustrating an example of a predicted payout amount due to the odds at the time of purchase.

FIG. 10 is a schematic diagram illustrating an example of a predicted payout amount after the odds change.

FIG. 11 is a schematic diagram illustrating an example of a predicted payout amount due to the odds at the time of purchase.

FIG. 12 is a schematic diagram illustrating an example of a predicted payout amount after the odds change.

FIG. 13 is a schematic diagram illustrating an example of a predicted payout amount after the odds change.

FIG. 14 is a schematic diagram illustrating an example of a predicted payout amount of when the additional purchase for each predetermined unit amount is performed.

FIG. 15 is a schematic diagram illustrating an example of a predicted payout amount of when the additional purchase for each predetermined unit amount is performed.

FIG. 16 is a schematic diagram illustrating an example of a predicted payout amount of when the additional purchase for each predetermined unit amount is performed.

FIG. 17 is a schematic diagram illustrating an example of information to be notified to the user.

FIG. 18 is a schematic diagram illustrating an example of information to be notified to the user.

FIG. 19 is a schematic diagram illustrating an example of information to be notified to the user.

MODES FOR CARRYING OUT THE INVENTION

Hereinafter, an embodiment of the present invention will be described with reference to the drawings. The embodiment described below is an embodiment when the present invention is applied to a betting ticket information provision system.

[1. Outline of Configuration and Function of Betting Ticket Information Provision System]

First, the configuration and general function of a betting ticket information provision system according to an embodiment of the present invention will be described with reference to FIG. 1.

Figure 1:
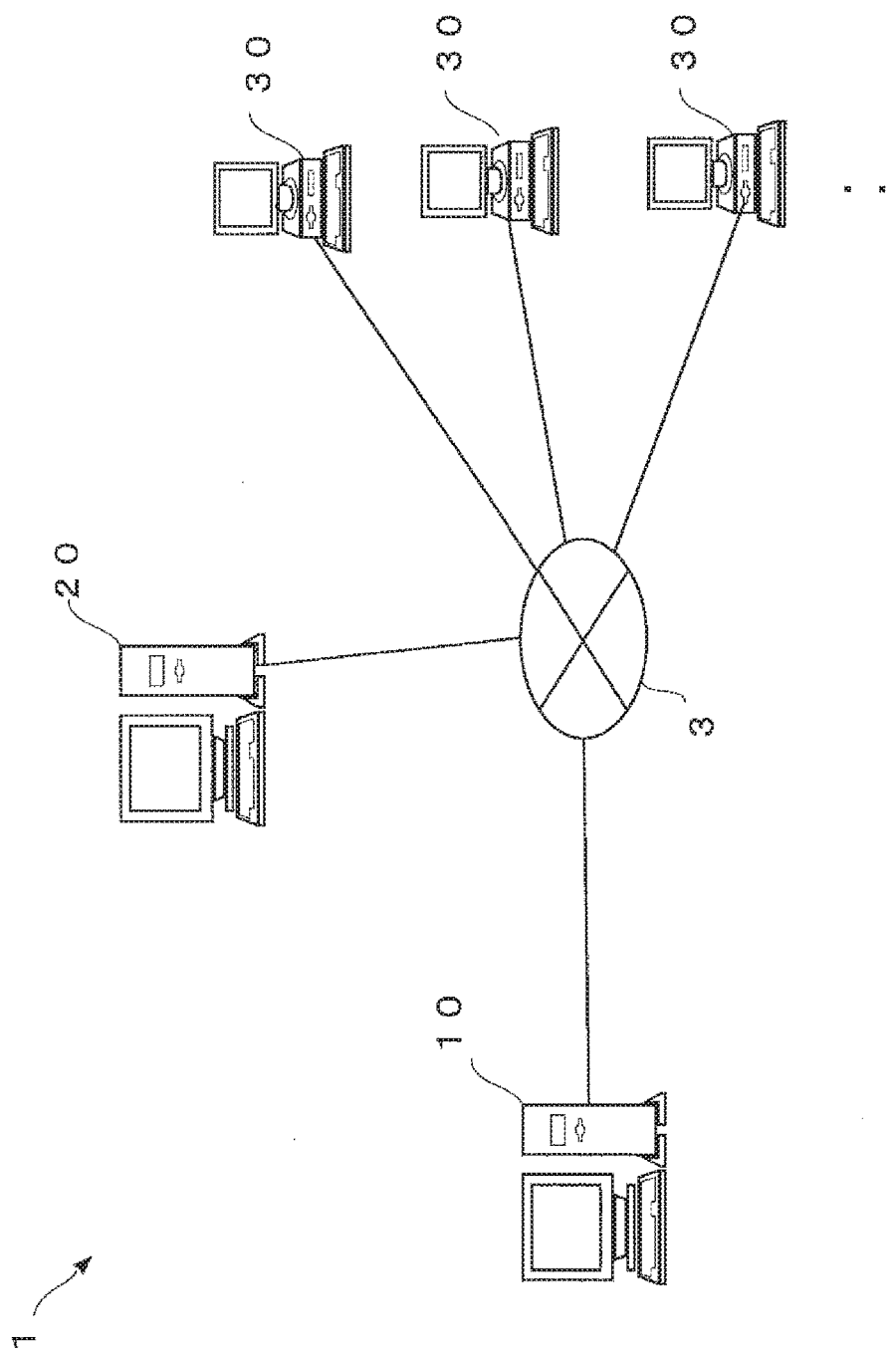
FIG. 1 is a schematic diagram illustrating a general configuration example of a betting ticket information provision system according to an embodiment of the present invention.

FIG. 1 is a schematic diagram illustrating a general configuration example of a betting ticket information provision system 1 according to this embodiment.

As shown in FIG. 1, the betting ticket information provision system 1 includes a betting ticket information provision server 10 (an example of a betting ticket information provision device) that provides information on betting tickets for racing such as horse racing, bicycle racing, or speedboat racing, a host server 20 on the host side that hosts or operates the racing and issues betting tickets, and terminal devices 30 (an example of a betting ticket information provision device) for users to receive provision of information from the betting ticket information provision server 10 and purchase betting tickets on sporting events (races).

The betting ticket information provision server 10, the host server 20, and the terminal device 30 are connected to each other by a network 3, and can transmit and receive data with a communication protocol (for example, TCP/IP). The network 3 is constructed by the Internet, a private communication line (for example, community antenna television (CATV) line), a mobile communication network (including base stations and others), a gateway, and others, for example. Incidentally, the betting ticket information provision server 10 and the host server 20 may be connected to each other by a private line to improve security.

The betting ticket information provision server 10 receives from the host server information announced by the host such as the odds of a race, the condition of a racecourse, information on racers such as horses, bicycles, or boats to participate in a race, and the result of a race. The betting ticket information provision server 10 outputs to the terminal devices 30 information to assist purchase of betting tickets by users at the terminal devices 30. The betting ticket information provision server 10 performs processing such as reception of purchase of betting tickets, and payout for a winning betting ticket to each terminal device 30. Thus, the betting ticket information provision server 10 is a server for operating a racing site such as a horse racing site.

Here, odds refer to a dividend rate (a rate on stakes), and include those successively announced as approximate odds before the start of a race, and those announced as fixed odds (final odds fixed finally) after the close of betting ticket sale. There are odds for each betting ticket type (type of betting method, a so-called betting type) of the betting tickets, and for each buying target (buying target composed of a racer number of a racer) that designates one or more racers out of racers to participate in a rare. That is, there are odds for each betting ticket corresponding to a buying target and a betting type. Incidentally, racers in a race may include horse jockeys, or participants who control or steer bicycles or boats.

Examples of betting types of betting tickets include win in which a racer predicted to finish first is designated, exacta in which racers predicted to finish first and second are designated in the correct order, trifecta in which racers predicted to finish first, second, and third are designated in the correct order, place in which a single racer predicted to finish first to third or first to second is designated, quinella in which two racers predicted to finish first to second are designated, bracket quinella in which brackets including racers predicted to finish first to second are designated, quinella place wide in which two racers predicted to finish first to third are designated, a trio in which three racers predicted to finish first to third are designated, and others.

A buying target includes, for a win, the number of a racer predicted to finish first, for an exacta, the numbers of racers predicted to finish first and second, for a trifecta, the numbers of racers predicted to finish first, second, and third, for a quinella, a combination of two designated racer numbers, for a bracket quinella, a combination of two designated bracket numbers (corresponding to the racer numbers of racers included in the brackets), for a quinella place wide, a combination of two designated racer numbers, for a trio, a combination of three designated racer numbers, and for a consecutive win, a single designated racer number.

The host server 20 performs the issuing processing of the betting ticket, and totalizes the odds to perform the announcing processing based on the issued betting ticket, with respect to the betting ticket sales mediation server 10, the terminal device installed in the racecourse and the betting ticket office, and the like.

There exist a plurality of terminal devices 30 of users, each of which displays the information for purchase of a betting ticket, and transmits the information about the betting ticket to be purchased to the betting ticket information provision server 10. In addition, the terminal device 30 of the user notifies the information after the purchase of the betting ticket with an image and a sound.

[2. Configuration and Function of Each Server]

(2.1 Configuration and Function of Betting Ticket Information Provision Server 10)

Next, the configuration and function of the betting ticket information provision server 10 will be described with reference to FIGS. 2 and 3.

Figure 2:
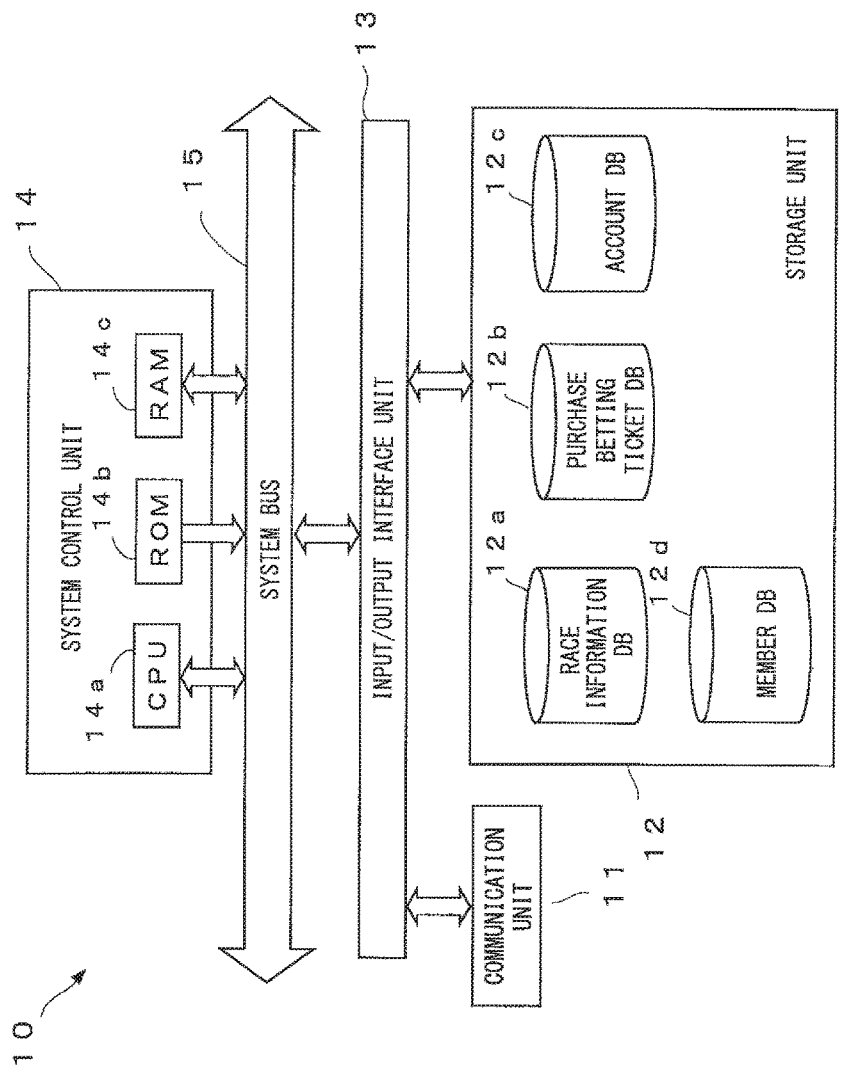
FIG. 2 is a block diagram illustrating an example of a general configuration of a betting ticket information provision server in FIG. 1.

FIG. 2 is a block diagram illustrating an example of a schematic configuration of the betting ticket information provision server 10. FIG. 3 is a schematic diagram illustrating an example of a purchase betting ticket database of the betting ticket information provision server 10.

As shown in FIG. 2, the betting ticket information provision server 10 functioning as a computer includes a communication unit 11, a storage unit 12, an input/output interface unit 13, and a system control unit 14. The system control unit 14 and the input/output interface unit 13 are connected to each other via a system bus 15.

The communication unit 11 (an example of the odds information acquisition means, an example of the output means, and an example of the acceptance means) is connected to the network 3 to control the communication state between the host server 20, the terminal devices 30, and the like, and furthermore, is connected to a local area network to transmit and receive data to and from other servers on the local area network.

The storage unit 12 is formed by a hard disk drive or the like, for example, and stores various programs such as an operating system and a server program, screen data on webpages for presenting information on races to be provided to users, and others. Incidentally, the various programs may be acquired from other server devices or the like via the network 3, or may be recorded on recording media and read via a drive device (not shown), for example.

In addition, in the storage unit 12, a race information database 12a for receiving the race information and the like about the race to be held in each stadium from the host server 20 to store (hereinafter referred to as "race information DB 12a"), a purchase betting ticket database 12b for storing the information about the betting ticket purchased by the user (hereinafter referred to as "purchase betting ticket DB 12b"), an account database 12c for accepting the deposit information about the funds for the betting ticket purchase from the user through the terminal device 30 to store (hereinafter referred to as "account DB 12c."), a member database 12d for storing information about the member (hereinafter referred to as "member DB 12d".), and the like are constructed.

In the race information DB 12a (an example of a storage means), race information acquired from the host server 20 such as odds information and race results is stored in association with a race ID that specifies a race to be held in each stadium.

Here, examples of race information include, in addition to approximate odds information before the start of a race, racecourse names, weathers at racecourses, race conditions such as the types of racecourses, such as whether racecourses are dirt or grass, the names of races to be held, the names, ages, and weights of horses to participate in races, the state of racers such as the types of bicycles or boats (including the names, ages, weights, and others of horse jockeys or bicycle or boat players), and others. Further, the race information includes information on final odds at the end of sale of betting tickets, the order in a race when the race is finished and the order is fixed, a time difference between the first and the second, and others.

Further, in the race information DB 12a, odds information on each betting type and on each racer pattern is stored in association with race IDs.

As illustrated in FIG. 3, the race ID, the betting type, the buying target, the purchase amount, the odds at the time of purchase, and the like of the purchased betting ticket are stored in association with the user ID of the user purchasing the betting ticket in the purchase betting ticket DB 12b. Incidentally, when the betting type is an exacta, the racer number of the racer expected to be first place is "1", and the racer number of the racer expected to be second place is "2", the data to be described in the box of the buying target is set to be "1-2". In addition, when the betting type is a quinella and the combination of the racer numbers of the racers (the combination of the racer numbers "1" and "2" of the racers) is expected to be first place and second place, the data to be described in the box of the buying target is also set to be "1-2".

In the account DB 12c, funds for users to purchase betting tickets are deposited, and the amounts are stored in association with user IDs. For example, a user determines a budget for betting tickets to purchase on a day when races are held, and transfers the amount of money by the budget from a bank on the Internet or the like to the account DB 12c by the terminal device 30 before buying a betting ticket. When a betting ticket wins, a payout is credited to the account DB 12c. When the user purchases a betting ticket, the amount of purchase is deducted from the balance of the user in the account DB 12c. Further, in the account DB 12c, an accumulated deposit amount as the accumulation of a deposit by a user from a bank or the like and a credit due to a payout is stored.

In the member DB 12d, user information on users registered as members (users of a horse racing site) is registered, such as user IDs, names, addresses, telephone numbers, e-mail addresses, occupations, hobbies, purchase histories, and subjects and categories of interest of the users. In the member DB 12d, user IDs, login IDs, and passwords required for users to log in to the horse racing site from the terminal devices 30 are registered. Here, the login IDs and passwords are login information used for login processing (user authentication processing).

In the storage unit 12, files or the like of webpages written in a markup language or the like such as Hypertext Markup Language (HTML) or Extensible Markup Language (XML) to allow information from the horse racing site to be displayed on the terminal devices 30 are stored.

The input/output interface unit 13 performs interface processing between the communication unit 11 and the storage unit 12, and the system control unit 14.

The system control unit 14 is constituted by a central processing unit (CPU) 14a, read-only memory (ROM) 14b, and random-access memory (RAM) 14c, or the like. The system control unit 14 performs processing for providing betting ticket information and others by the CPU 14a reading and executing various programs stored in the ROM 14b and the storage unit 12.

(2.2 Configuration and Function of Host Server 20)

Next, the configuration and function of the host server 20 will be described with reference to FIG. 4.

Figure 4:
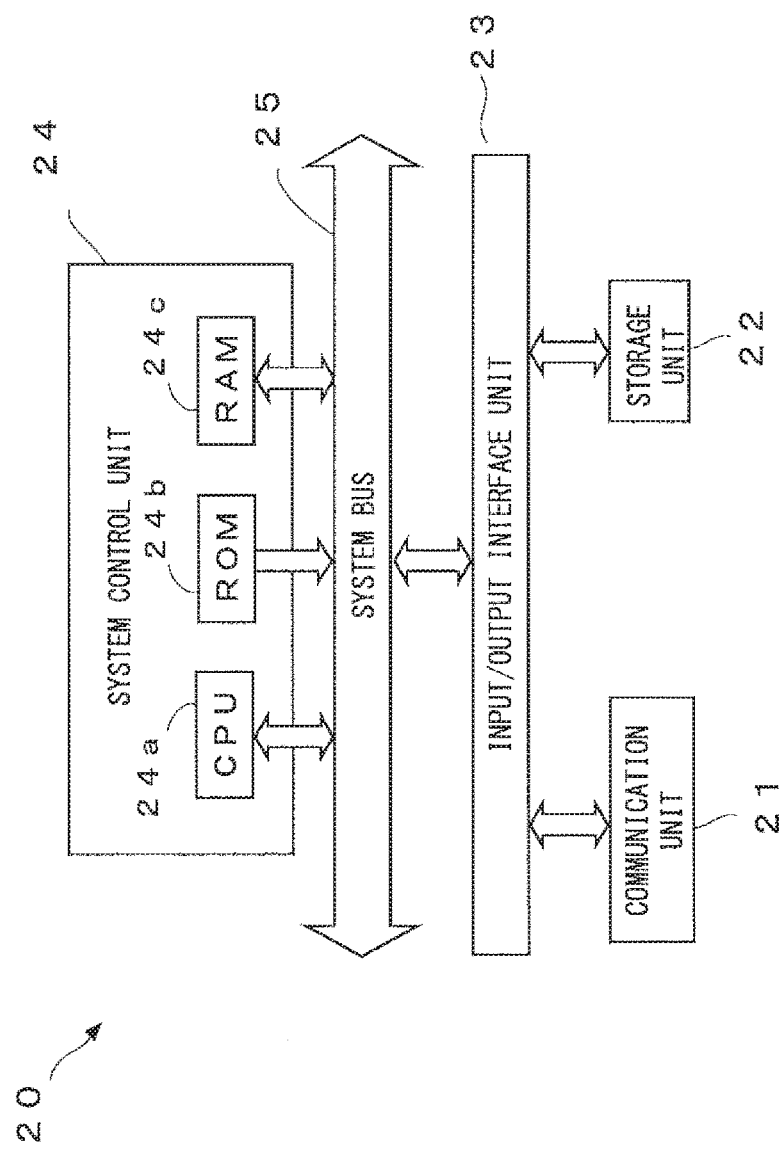
FIG. 4 is a block diagram illustrating an example of a general configuration of a host server in FIG. 1.

FIG. 4 is a block diagram illustrating an example of a general configuration of the host server 20.

As shown in FIG. 4, the host server 20 includes a communication unit 21, a storage unit 22, an input/output interface unit 23, and a system control unit 24, and the system control unit 24 and the input/output interface unit 23 are connected via a system bus 25. The configuration and function of the host server 20 are almost identical to the configuration and function of the betting ticket information provision server 10, and thus difference in each component and each function of the betting ticket information provision server 10 will be mainly described.

The communication unit 21 (an example of the odds information acquisition means) is configured, for example, to control the communication state with the terminal device 30, the betting ticket information provision server 10, and the like through the network 3, the local area network, and the like.

In the storage unit 22, information on races and the like are stored.

The system control unit 24 is constituted by a CPU 24a, ROM 24b, and RAM 24c, or the like. The system control unit 24 performs processing of transmitting odds information to the betting ticket information provision server 10 and others by the CPU 24a reading and executing various programs stored in the ROM 24b and the storage unit 22.

(2.3 Configuration and Function of Terminal Device 30)

Next, the configuration and function of the terminal devices 30 will be described with reference to FIG. 5.

Figure 5:
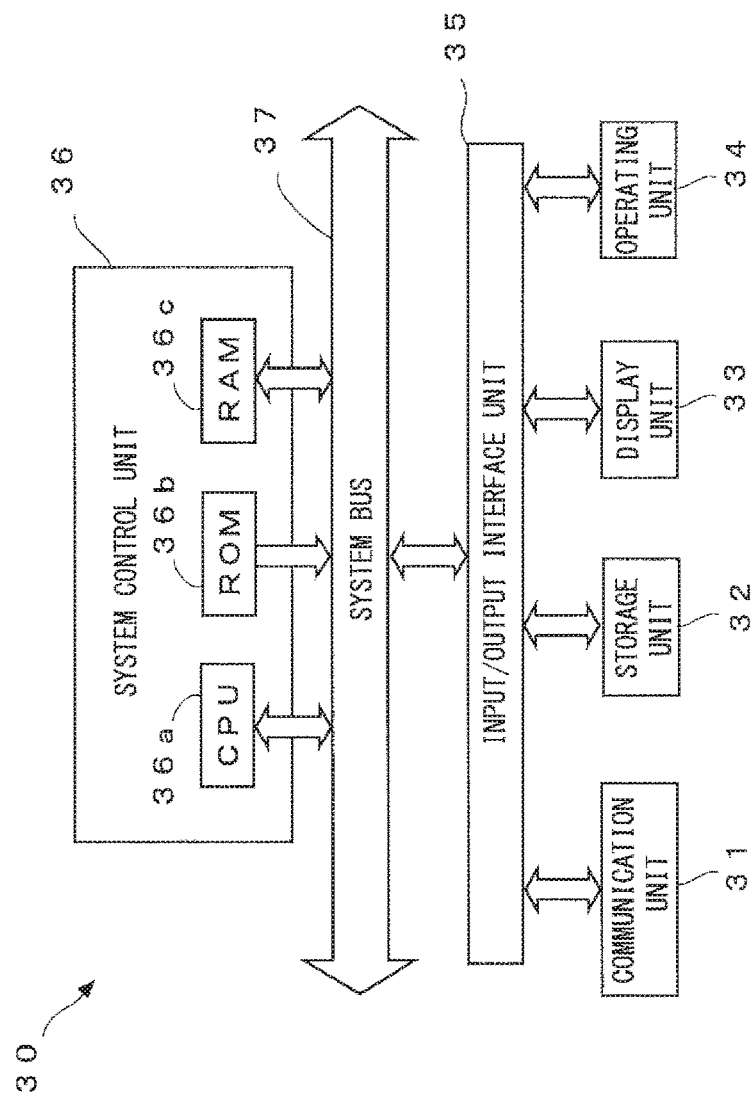
FIG. 5 is a block diagram illustrating an example of a schematic configuration of a terminal device in FIG. 1.

FIG. 5 is a block diagram illustrating an example of a general configuration of the terminal devices 30.

As shown in FIG. 5, a terminal device 30 functioning as a computer may be a personal computer, a portable wireless telephone such as a smartphone, or a mobile terminal such as a PDA, for example, and includes a communication unit 31, a storage unit 32, a display unit 33, an operating unit 34, an input/output interface unit 35, and a system control unit 36. The system control unit 36 and the input/output interface unit 35 are connected to each other via a system bus 37.

The communication unit 31 controls communication with the betting ticket information provision server 10 and others through the network 3. When the terminal device 30 is a mobile terminal device, the communication unit 31 has a wireless communication function for connection to a mobile communication network in the network 3.

The storage unit 32 has, for example, a hard disk drive or the like, and stores an operating system, a web browser program, a web browser tool bar program, and others. Moreover, the storage unit 32 stores dedicated software (so-called application) that displays information from the betting ticket information provision server 10 or purchases betting tickets, and others.

The display unit 33 (an example of the output means) is constituted by a liquid crystal display device, an electro luminescence (EL) device, or the like, for example. On the display unit 33, a top page screen of a horse racing site or a webpage of a race information table for the purchase of a betting ticket on a specific race is displayed by a web browser.

The operating unit 34 (an example of the acceptance means) is constituted by a keyboard, a mouse, and the like. The user inputs the response by using the operating unit 34. Incidentally, when the display unit 33 is a display panel of the touch switch system such as a touch panel, the operating unit 34 acquires the position information of the display unit 33 that the user comes in contact with or approaches.

The input/output interface unit 35 is an interface between the communication unit 31 and the storage unit 32, and the system control unit 36.

The system control unit 36 has a CPU 36a, ROM 36b, and RAM 36c, for example. In the system control unit 36, the CPU 36a reads and executes various programs stored in the ROM 36b, the RAM 36c, and the storage unit 32. For example, the system control unit 36 executes a web browser program, functioning as a web browser.

[3. Operation of Betting Ticket Information Provision System]

Next, an operation of the betting ticket information provision system 1 according to an embodiment of the present invention will be described with reference to FIGS. 6 to 19.

Figure 7:
FIG. 7 is a schematic diagram illustrating an example of a display of the terminal device in FIG. 1.
Figure 8:
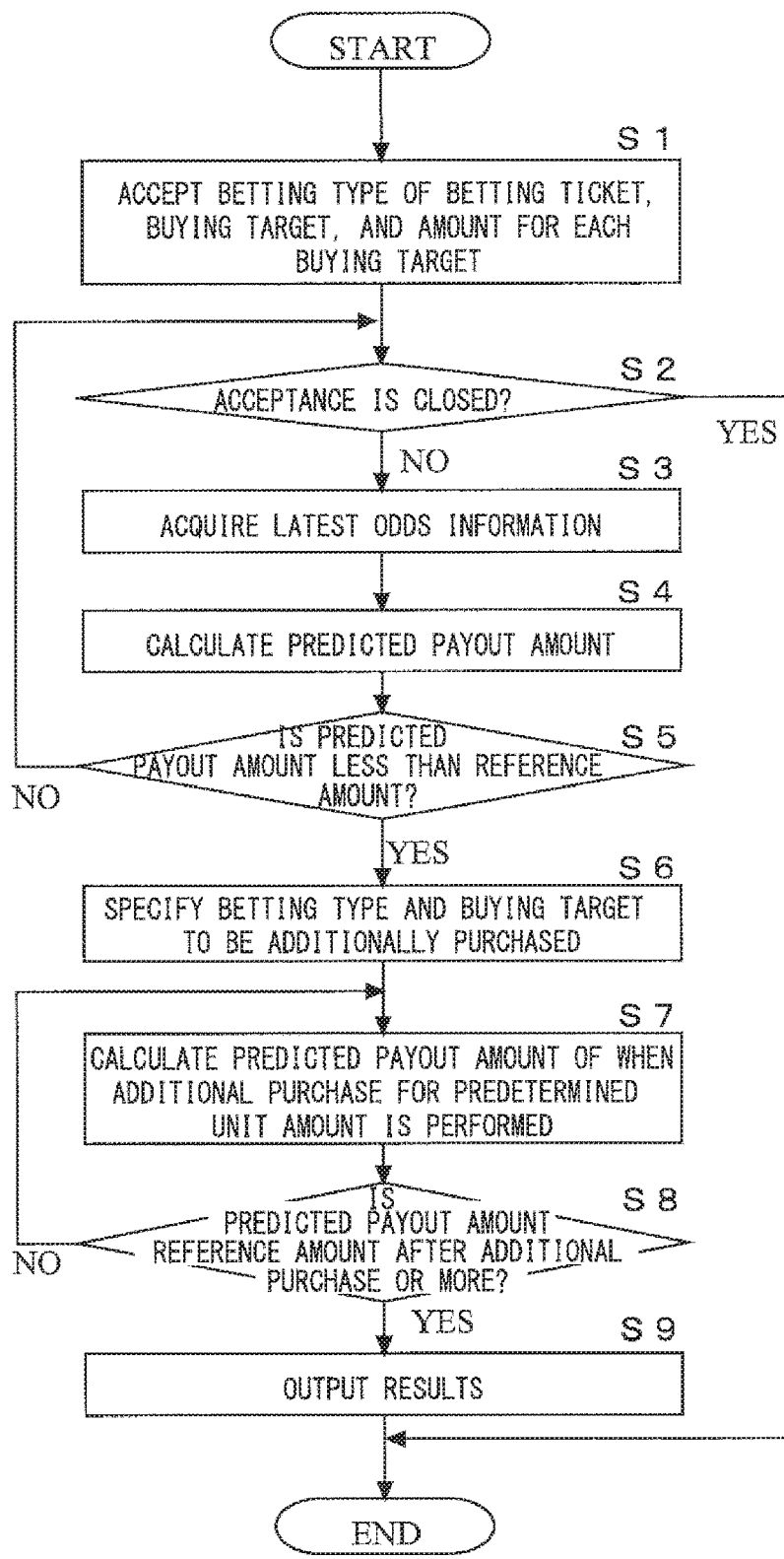
FIG. 8 is a flowchart illustrating an operation example of the betting ticket information provision system in FIG. 1.

FIGS. 6 and 7 are schematic diagrams illustrating an example of a display of the terminal device 30. FIG. 8 is a flowchart illustrating an operation example of the betting ticket information provision system 1.

FIGS. 9 and 11 are schematic diagrams illustrating an example of a predicted payout amount due to the odds at the time of purchase. FIGS. 10, 12, and 13 are schematic diagram illustrating an example of a predicted payout amount after the odds change. FIGS. 14 to 16 is are schematic diagrams illustrating an example of a predicted payout amount of when the additional purchase for each predetermined unit amount is performed. FIGS. 17 to 19 are schematic diagrams illustrating an example of information to be notified to the user.

First of all, the user keeps the money necessary for the user to purchase the betting ticket deposited in the horse racing site beforehand. For example, the user keeps the funds for the betting ticket purchase deposited in his account opened in the betting ticket information provision server 10 beforehand before purchasing the betting ticket as the budget of the betting ticket to be purchased for the race to be held today. The user logs into the horse racing site of the betting ticket information provision server 10 from the terminal device 30 to perform the procedure of the deposit. The betting ticket information provision server 10 refers to the member DB 12d to perform the login processing, then accepts the deposit. Then, the betting ticket information provision server 10 stores the deposit information in the account corresponding to the user ID in the account DB 12c. Incidentally, the deposit procedure may be performed for each race by study of the situation of each race.

After the deposit is accepted, the user performs a study for purchasing the betting ticket, for example, based on the race information table, and selects the race number, the betting type, and the buying target in the Web page or the application program to enter the purchase amount (acceptance amount) when the betting ticket to be purchased is determined.

For example, as illustrated in FIG. 6, the race number, the betting type, and the buying target are selected, and the purchase amount of each buying target is decided so that the predicted payout amount in each buying target in the case of winning exceeds the sum of purchase amounts ("total: ¥800") (the sum of acceptance amounts). In addition, as illustrated in FIG. 7, in the case where there are a plurality of betting types, and when the race result is finalized, the purchase amount of each buying target is decided so that the predicted payout amount of a combination of different betting types exceeds the sum of purchase amounts (total: "¥3,300") in the buying targets to simultaneously win in different betting types (a win "1", an exacta "1-2", and an exacta "1-3"), or the predicted payout amount of each buying target exceeds the sum of purchase amounts (total: "¥3,300") in the buying target to individually win (an exacta "2-1", and the like). Incidentally, the predicted payout amount is the product of the purchase amount and the current odds.

Incidentally, the betting ticket information provision server 10 generates the race information table from the race information (including the odds information) transmitted sequentially from the host server 20.

After the input of the purchase amount, when the purchase button is clicked by the user, the betting ticket purchase information such as the race number, the betting type, the buying target, and the purchase amount is transmitted from the terminal device 30 to the betting ticket information provision server 10 together with the user ID.

Next, as illustrated in FIG. 8, the betting ticket information provision system 1 accepts the betting ticket purchase information such as the betting type of betting ticket, the buying target in the betting type, and the amount for each buying target (step S1). Specifically, the betting ticket information provision server 10 receives the betting ticket purchase information from the terminal device 30 through the communication unit 11.

The betting ticket information provision server 10 stores the accepted betting ticket purchase information in the purchase betting ticket DB 12b in association with the user ID.

Thus, the betting ticket information provision server 10 functions as an example of the acceptance means for accepting from the user the betting type of the betting ticket for designating one or more racers out of the racers to participate in the race of the racing, the buying target in the betting type, and the acceptance amount for each of the buying targets.

The betting ticket information provision server 10, at predetermined time intervals, aggregates betting ticket purchase information received from each terminal device 30 including the other users for each race, betting type, and buying target to generate summary data. The betting ticket information provision server 10 transmits generated summary data to the host server 20.

Incidentally, the betting ticket information provision server 10 may transmit the summary data to the host server 20 at irregular intervals, instead of the predetermined time intervals, or may transmit the summary data to the host server 20 in response to a request from the host server 20. Moreover, the summary data are data, for example, that normally do not include user IDs corresponding to names of respective users and in which the betting count is aggregated for each race, betting type, and buying target.

Next, the betting ticket information provision system 1 determines whether the acceptance of betting ticket is closed (step S2). Specifically, the betting ticket information provision server 10 determines whether the acceptance is closed regarding the race of the race number of the betting ticket. For example, as the deadline for acceptance of the betting ticket, the cases such as a predetermined time before the time at which a predetermined race is started, and when the information about the deadline for acceptance of betting ticket is received from the host server 20 can be cited. The predetermined time is set in consideration of the time, for example, required for the user to purchase the betting ticket.

If the acceptance of the betting ticket is closed (YES in step S2), the betting ticket information provision system 1 ends the processing.

If the acceptance of the betting ticket is not closed (NC) in step S2), the betting ticket information provision system 1 acquires the latest odds information (step S3). Specifically, the system control unit 14 of the betting ticket information provision server 10 sequentially receives the latest odds information through the communication unit 11 as the race information sequentially transmitted from the host server 20.

Thus, the betting ticket information provision server 10 functions as an example of the odds information acquisition means for acquiring the odds information about the race of the racing.

Next, the betting ticket information provision server 10 stores the race information in the race information DB 12a. Specifically, the system control unit 14 of the betting ticket information provision server 10 stores the race information in the race information DB 12a in association with the race ID to accumulate and update. Thus, the latest race information is stored in the race information DB 12a.

Here, the generation of race information will be described.

The host server 20, based on the summary data from the betting ticket information provision server 10, data from betting ticket counter, and others, calculates odds for each betting type and buying target in each race. Moreover, the host server 20 acquires information on the condition of the racecourse. The host server 20 generates the race information from calculated odds, acquired information on the condition of the racecourse, and others.

Incidentally, the system control unit 24 of the host server 20 may transmit the race information to the betting ticket information provision server 10 at irregular intervals, instead of the predetermined time intervals, or may transmit the race information to the betting ticket information provision server 10 in response to a request from the betting ticket information provision server 10. Moreover, the system control unit 24 of the host server 20 may transmit odds information to the betting ticket information provision server 10 each time the odds are updated.

Next, the host server 20 sequentially transmits the race information to the betting ticket information provision server 10. Specifically, the system control unit 24 of the host server 20 transmits the race information such as the odds information of each betting ticket changing in the sales situation of the betting ticket to the betting ticket information provision server 10 along with the race ID for specifying the race, the betting type, and the buying target through the communication unit 21, for example, at predetermined time intervals while the race is held.

After acquiring the latest odds information, the betting ticket information provision system 1 calculates the predicted payout amount (step S4). Specifically, the betting ticket information provision server 10 calculates the predicted payout amount by multiplying the latest odds and the purchase amount.

Next, the betting ticket information provision system determines whether the predicted payout amount is less than the reference amount (step S5) Specifically, the betting ticket information provision server 10 determines whether there is a buying target whose predicted payout amount is less than the reference amount.

Here, as an example of the reference amount, the sum of the purchase amounts (for example, \800 in the case illustrated in FIG. 6, and \3,300 in the case illustrated in FIG. 7), the amount allowed a predetermined subtraction from the sum of the purchase amounts (such as the amount reduced by 5% of the sum of the purchase amounts and the amount reduced based on the user's history), the amount reduced by a predetermined ratio from each of the predicted payout amounts, and the like can be cited.

As the case where the predicted payout amount is less than the reference amount, as illustrated in FIGS. 9 and 10, there is a case where the buying target "1-2" of the betting type "a quinella" falls from the odds "3.0" at the time of purchase to the odds "1.5", and falls to the predicted payout amount ¥750, which causes the predicted payout amount to be less than the sum of the purchase amounts ¥800 (reference amount).

As illustrated in FIGS. 11 and 12, in the case of simultaneous wins in different betting types, the combined sum of the predicted payout amounts is determined depending on whether the combined sum is less than the reference amount. For example, as the case where the predicted payout amount (combined sum predicted payout amount) is less than the reference amount, there is a case where the buying target "1-2" of the betting type "an exacta" falls from the odds "3.0" at the time of purchase to the odds "1.8" and falls to the predicted payout amount ¥1,800, and the buying target "1" of the betting type "a win" winning at the same time as the buying target "1-2" of the betting type "an exacta" falls from the odds "3.5" at the time of purchase to the odds "2.5" and falls to the predicted payout amount ¥1,250, and the combined sum of the predicted amounts falls to ¥3,050, so that the sum of the predicted amounts is less than the sum of the purchase amounts ¥3,300 (reference amount).

Incidentally, although the buying target "1" of the betting type "a win" winning at the same time as the buying target "1-3" of the betting type "an exacta" falls from the odds "3.5" at the time of purchase to the odds "2.5" and the combined sum of the predicted payout amounts falls to \4,450, the combined sum of the predicted payout amounts is the sum of the purchase amounts \3,300 (reference amount) or more, and therefore the buying target of the combination of the buying target "1-3" of the betting type "an exacta" and the buying target "1" of the betting type of "a win" is not determined that the predicted payout amount is less than the reference amount. In addition, the buying target "2-1" of the betting type "an exacta" and the like are determined individually.

As illustrated in FIGS. 11 and 13, there is a case where the predicted payout amount is less than the reference amount in a plurality of buying targets.

As illustrated in FIG. 13, the buying target "1-2" of the betting type "an exacta." falls from the odds "3.0" at the time of purchase to the odds "1.5" and falls to the predicted payout amount ¥1,500, and the buying target "1" of the betting type "a win" winning at the same time as the buying target "1-2" of the betting type "an exacta" falls from the odds "3.5" at the time of purchase to the odds "2.5" and falls to the predicted payout amount ¥1,250, and the combined sum of the predicted payout amounts fails to ¥2,750, so that the sum of the predicted payout amounts is less than the sum of the purchase amounts ¥3,300 (reference amount).

Furthermore, as illustrated in FIG. 13, the buying target "1-3" of the betting type "an exacta" falls from the odds "8.0" at the time of purchase to the odds "4.0" and falls to the predicted payout amount ¥1,600, and the buying target "1" of the betting type "a win" winning at the same time as the buying target "1-3" of the betting type "an exacta" falls from the odds "3.5" at the time of purchase to the odds "2.5" and falls to the predicted payout amount ø1,250, and the combined sum of the predicted payout amounts falls to ¥2,850, so that the sum of the predicted payout amounts is Less than the sum of the purchase amounts ¥3,300 (reference amount).

If the predicted payout amount is not less than the reference amount (NO in step S5), the betting ticket information provision system 1 returns to the process in step S2.

If the predicted payout amount is less than the reference amount (YES in step S5), the betting ticket information provision system 1 specifies the betting type and the buying target to be additionally purchased (step S6). Specifically, the betting ticket information provision server 10 specifies the betting type and the buying target to be additionally purchased from the buying target falling below the reference amount.

As illustrated in FIG. 10, the betting type and the buying target to have the predicted payout amount less than the reference amount, that is, the buying target "1-2" of the betting type "a quinella" falling below the reference amount is specified.

As illustrated in FIG. 12, the buying target is specified from the set of the buying target "1-2" of the betting type "an exacta" and the buying target "1" of the betting type "a win" falling below the reference amounts. In this case, the current odds of the buying target "1-2" of the betting type "an exacta" and the current odds of the buying target "1" of the betting type "a win" are compared, and the buying target of the higher odds is specified.

In addition, as illustrated in FIG. 13, a predetermined buying target is specified from the set of the buying target "1-2" of the betting type "an exacta" and the buying target "1" of the betting type "a win" falling below the reference amounts, and the set of the buying target "1-3" of the betting type "an exacta" and the buying target "1" of the betting type "a win" falling below the reference amounts.

Here, assume that the current odds of the buying target "1-2" of the betting type "an exacta" is "a", the current odds of the buying target "1-3" of the betting type "an exacta" is "b", and the current odds of the buying target "1" of the betting type "a win" is "c".

When the buying target "1" of the betting type "a win" is additionally purchased for ¥100, the two of the combined sum of the predicted payout amounts of the buying target "1-2" of the betting type "an exacta" and the buying target "1" of the betting type "a win" and the combined sum of the predicted payout amounts of the buying target "1-3" of the betting type "an exacta" and the buying target "1" of the betting type "a win" increase by ¥100xc. On the other hand, when the betting type "an exacta" is additionally purchased, there is a need to additionally purchase the two of the buying target "1-2" and the buying target "1-3", and therefore when the additional purchase for ¥100 is performed for each buying target, there is a need to perform the additional purchase for a total of ¥200.

For this reason, when a>2c and b>2c, it is easier for the combined sum of the predicted payout amounts to rise by the additional purchase for ¥100 of each of the buying target "1-2" and the buying target "1-3" of the betting type "an exacta", rather than by the additional purchase for ¥200 of the buying target "1" of betting type "a win". Therefore, in the case of a>2c and b>2c, when the betting type "an exacta" is additionally purchased, the buying target "1-2" and the buying target "1-3" are specified.

As illustrated in FIG. 13, when a=1.5, b=4.0, and c=2.5, the relation of a>2c and b>2c does not hold, and therefore the buying target "1" of the betting type "a win" is specified.

Thus, when there are two or more types of betting types accepted from the user, the betting ticket information provision server 10 functions as an example for specifying the betting type to be additionally purchased, depending on the comparison between the odds information in one type of betting type and the odds information in another type of betting type among the types of betting types.

Incidentally, as illustrated in FIG. 10, in the case of one type of betting type, there is no need to consider the combination, and therefore only the betting type and the buying target of when the predicted payout amount becomes less than the reference amount need to be specified. In addition, even in the case of two or more types of betting types, when there is no buying target winning simultaneously in different betting types, only the betting type and the buying target of when the predicted payout amount becomes less than the reference amount need to be specified.

In addition, at least the purchase unit amount (¥100) of the betting ticket needs to be additionally purchased for each of the buying targets of when the predicted payout amount becomes less than the reference amount, and therefore another buying target to have less than the addition reference amount calculated from the addition amount of the sum of the purchase amounts and the amount obtained by multiplying the number of the buying targets of when the predicted payout amount becomes less than the reference amount by the purchase unit amount of the betting ticket (¥100) (the buying target not less than the reference amount) also needs to be specified as the buying target of the additional purchase target.

As illustrated in FIG. 10, when the number of the buying targets of when the predicted payout amount becomes less than the reference amount is one in the betting type, the addition reference amount is ¥900. The buying target "1-3" and "2-3" of "a quinella" are not specified because their predicted payout amounts are the addition reference amount ¥900 or more.

Next, the betting ticket information provision system 1 calculates the predicted payout amount of when the purchase unit amount of additional purchase is performed (step S7). Specifically, the betting ticket information provision server 10 calculates the predicted payout amount of when the additional purchase for the purchase unit amount (for example, the minimum purchase amount ¥100) is performed for the specified betting type and buying target.

In the case as illustrated in FIG. 10, the additional purchase for ¥100 is performed, and the predicted payout amount becomes ¥900 for the specified betting type "a quinella" and the buying target "1-2".

In the case as illustrated in FIG. 12, the additional purchase for ¥100 is performed, and the combined sum of the predicted payout amount becomes ¥3,300 for the specified betting type "a win" and the buying target "1".

In the case as illustrated in FIG. 13, for the specified betting type "a win" and buying target "1", the additional purchase for ¥100 is performed, as illustrated in FIG. 14, the combined sum of the predicted payout amounts with the buying target "1-2" of the betting type "an exacta" becomes ¥3,000, and as illustrated in FIG. 15, the combined sum of the predicted payout amounts with the buying target "1-3" of the betting type "an exacta" becomes ¥3,100.

Next, the betting ticket information provision system 1 determines whether the predicted payout amount is the reference amount after the additional purchase or more (step S8). Specifically, the betting ticket information provision server 10 determines whether the predicted payout amount, or the combined sum of the predicted payout amounts after the additional purchase is the reference amount with respect to the total purchase amount increased due to the additional purchase (the reference amount added with the additional purchase amount). Furthermore, to prevent occurrence of what is called "torigami" (loss despite win), the betting ticket information provision server 10 determines whether the predicted payout amount, or the combined sum of the predicted payout amounts after the additional purchase is the reference amount after the additional purchase or more even for other betting types and buying targets not specified in step S6.

In the case as illustrated in FIG. 10, the additional purchase for ¥100 is performed for the specified betting type "a quinella" and the buying target "1-2", and the reference amount added with the additional purchase amount reaches the total purchase amount ¥900 increased, for example, due to the additional purchase. Therefore, the predicted payout amount ¥900 becomes the reference amount added with the additional purchase amount or more. Incidentally, each of the predicted payout amounts of the buying targets of "1-3" and "2-3" of the betting type "a quinella" is the total purchase amount ¥900 or more, and therefore the torigami is not present.

In the case as illustrated in FIG. 12, the additional purchase for ¥100 is performed for the specified betting type "a win" and the buying target "1", and the reference amount added with the additional purchase amount reaches the total purchase amount ¥3,400 increased, for example, due to the additional purchase. The combined sum of the predicted payout amounts ¥3,300 does not become the reference amount added with the additional purchase amount or more.

In the case as illustrated in FIG. 13, the additional purchase for ¥100 is performed for the specified betting type "a win" and the buying target "1", and the reference amount added with the additional purchase amount reaches the total purchase amount ¥3,400 increased, for example, due to the additional purchase. As illustrated in FIG. 14, the combined sum of the predicted payout amounts with the buying target "1-2" of the betting type "an exacta" ¥3,000, and as illustrated in FIG. 15, the combined sum of the predicted payout amounts with the buying target "1-3" of the betting type "an exacta" ¥3,100 does not reach the reference amount added with the additional purchase amount or more.

If the predicted payout amount is not the reference amount after the additional purchase or more (NO in step S8), the betting ticket information provision system 1 returns to the process in step S7, and repeats the process in step S7 until the predicted payout amount or the combined sum of the predicted payout amounts reaches the reference amount after the additional purchase or more.

In the case as illustrated in FIG. 12, if the additional purchase for ¥100 is further performed for the specified betting type "a win" and buying target "1", and the additional purchase for ¥200 in total is performed, the combined sum of the predicted payout amounts with the buying target "1-2" of the betting type "an exacta" ¥3,550 reaches the reference amount added with the additional purchase amount (for example, total purchase amount ¥3,500) or more, and each of the predicted payout amounts is the total purchase amount ¥3,500 or more even in other betting types and buying targets not specified, and therefore the process in step S7 ends.

Incidentally, in the case as illustrated in FIG. 10, after the process in step S6, instead of the processes in steps S7 and S8, the betting ticket information provision server 10 may solve the equation $1.5x+750=800+x$ (equation: odds x+predicted payout amount=total purchase amount+x) where the additional purchase amount is denoted by x, and may obtain x=100. In addition, in the case as illustrated in FIG. 12, after the process in step S6, instead of the processes in steps S7 and S8, the betting ticket information provision server 10 may solve the equation $2.5x+1,800+1,250=3,300+x$ where the additional purchase amount is denoted by x, and may obtain x=166.66, and may calculate the additional purchase amount x=200 so that a natural number multiple of the purchase unit amount of the betting ticket (for example, ¥100) is satisfied.

In the case as illustrated in FIG. 13, as illustrated in FIG. 14, if the additional purchase for ¥400 in total is performed for the specified betting type "a win" and buying target "1", the combined sum of the predicted payout amounts with the buying target "1-2" of the betting type "an exacta" ¥3,750 reaches the reference amount added with the additional purchase amount (for example, total purchase amount ¥3,700) or more. As illustrated in FIG. 15, if the additional purchase for ¥400 in total is performed for the specified betting type "a win" and buying target "1", the combined sum of the predicted payout amounts with the buying target "1-3" of the betting type "an exacta" ¥3,850 reaches the reference amount added with the additional purchase amount (for example, total purchase amount ¥3,700) or more.

However, if the total purchase amount is ¥3,700, the torigami will occur in the case of unspecified other betting types and buying targets (an exacta "2-1", "3-1", and "2-3"). In step S8, an exacta "2-1", "3-1", and "2-3" are set to be the newly specified betting types and buying targets. In step S7, the additional purchase for ¥100 is performed on each of an exacta "2-1", "3-1", and "2-3". The total amount of the betting type "an exacta" reaches ¥3,100 as illustrated in FIG. 16.

As illustrated in FIG. 16, the buying target "1" of the betting type "a win" is additionally purchased for ¥600, and the process in step S7 is performed until the combined sum of the predicted payout amounts ¥4,250 exceeds the total amount ¥4,200.

Incidentally, even if the buying target "1" of the betting type "a win" is additionally purchased for ¥400, in the case of other betting types and buying targets to be the torigami (an exacta "2-1", "3-1", and "2-3"), there is a ¥100 loss, and therefore if this is allowed to be the reference amount (total purchase amount—¥100), in the case as illustrated in FIGS. 14 and 15, the betting ticket information provision server 10 may end the additional purchase processing of the process in step S7. The reference amount is expressed as the total purchase amount–the allowable maximum amount. The allowable maximum amount may be set by the user, or may be determined by the user information such as the user history and the age of the user. Whether the user is a type who does not allow any deficit at all, or can allow a little deficit may be obtained from the user information.

In addition, as illustrated in FIG. 15, the buying target "1-3" of the betting type "an exacta" is already the reference amount or more due to the additional purchase for ¥300, and therefore, may deviate from the buying target of the additional purchase target, that is, the specified buying target.

After this, the additional purchase target may focus attention on the buying target "1-2" of the betting type "an exacta".

If the predicted payout amount is the reference amount after the additional purchase or more (YES in step S8), the betting ticket information provision system 1 outputs the result (step S9). Specifically, the betting ticket information provision server 10 transmits the information to be notified to the user to the terminal device 30 through the communication unit 11. Incidentally, the betting ticket information provision server 10 may transmit the information to be notified to the user to the email address associated with the member DB 12*d* as the mail notification.

Thus, the betting ticket information provision server 10 functions as an example of an output means that outputs the information to be notified to the user when at least one predicted payout amounts out of each predicted payout amount calculated from each acceptance amount for each buying target of the betting type of the betting ticket accepted from the user and the acquired odds information is less than the reference amount based on the total acceptance amount accepted from the user.

Incidentally, if the betting ticket as illustrated in FIG. 10 is purchased, the betting ticket information provision server 10 transmits the information to be notified to the user as illustrated in FIG. 17 to the terminal device 30. The terminal device 30 displays the information to be notified to the user who receives on the display unit 33 as illustrated in FIG. 17. If transmitted to the email address associated with the member DB 12*d* as a mail, the information to be notified to the user is displayed on the display unit 33 as the mail screen.

Here, as an example of the information to be notified to the user, the display 41 of the announcement of when the predicted payout amount of the predetermined buying target falls below the reference amount, the display 42 for indicating which buying target falls below the reference amount, and the recommendation display 45 of the additional purchase can be cited. The display 42 is an example of the output of the information about the specified betting type and buying target.

When the user performs the additional purchase, the button of the additional purchase is selected, and the display of the additional purchase procedure is performed.

In addition, as illustrated in FIG. 12, when the odds fall after the betting ticket of a plurality of betting types is purchased, the betting ticket information provision server 10 transmits the information to be notified to the user as illustrated in FIG. 18 to the terminal device 30. The terminal device 30 displays the information to be notified to the user who receives on the display unit 33 as illustrated in FIG. 18.

In addition, as illustrated in FIG. 13, when the betting ticket of a plurality of betting types is purchased, then the odds fall, the betting ticket information provision server 10 transmits the information to be notified to the user as illustrated in FIG. 19 to the terminal device 30. The terminal device 30 displays the information to be notified to the user who receives on the display unit 33 as illustrated in FIG. 19.

Here, as an example of the information to be notified to the user, the display 41 of the announcement of when the predicted payout amount of the predetermined buying target falls below the reference amount, the display 42 for indicating which buying target falls below the reference amount, the recommendation display 45 of the additional purchase, the recommendation display 46 of the additional purchase, and the additional purchase confirmation display 47 can be cited.

As described above, according to the present embodiment, the odds fall after the purchase of the betting ticket, and when the predicted payout amount is less than the reference amount (for example, the total purchase amount or the amount allowed a predetermined reduction from the total purchase amount), the information to be notified to the user (for example, the displays 41 and 42, the recommendation displays 45 and 46, and the confirmation display 47) is output, and therefore the unexpected loss to the user can be prevented.

In addition, the betting type and the buying target to have the predicted payout amount less than the reference amount are specified, and when the information about the specified betting type and buying target (for example, the display 42) is output, it is found which predicted payout amount of a buying target of a betting type is less than the reference amount, and the unexpected loss to the user can be prevented.

In addition, the betting type and the buying target to have the predicted payout amount less than the reference amount are specified, and when the betting type, the buying target, and the additional purchase amount where the predicted payout amount of when the betting ticket indicated by the specified betting type and buying target is additionally purchased reaches the reference amount added with the additional purchase amount or more are included in the information to be notified to the user to be output, the recommendation can be made to the user so that an unexpected loss can be reduced by the additional purchase as illustrated in FIGS. 17 to 19. In addition, the betting type and the buying target to have the predicted payout amount less than the reference amount are specified, then the additional purchase amount is determined, and therefore the additional purchase amount can be efficiently determined.

In addition, the betting type and the buying target to have the predicted payout amount less than the reference amount are specified, the additional purchase is repeated until the predicted payout amount of when the betting ticket indicated by the specified betting type and buying target is additionally purchased for the purchase unit amount reaches the reference amount added with the additional purchase amount or more, and when the betting type, the buying target, and the additional purchase amount as a result of the repetition are included in the information to be notified to the user to be output, the recommendation can be made to the user so that an unexpected loss can be reduced by the additional purchase. In addition, the betting type and the buying target to have the predicted payout amount less than the reference amount are specified, then the additional purchase amount is sequentially determined by the purchase unit amount of additional purchase, and therefore the additional purchase amount can be easily and efficiently determined.

In addition, when only the betting type and the buying target to have the predicted payout amount less than the reference amount are specified, the targets to be additionally purchased are narrowed down to only the betting type and the buying target to have the predicted payout amount less than the reference amount, whereby the buying target to be additionally purchased can be effectively searched.

In addition, the reference amount added with the additional purchase amount is calculated from the addition amount of the sum of the acceptance amounts (the total purchase amount) and the amount obtained by multiplying the number of the buying targets to have the predicted payout amount less than the reference amount in the betting type by the purchase unit amount of the betting ticket (for example, ¥100), and when the buying target to be additionally purchased is specified from the buying targets to have the predicted payout amount less than the reference amount added with the additional purchase amount, the additional purchase target is narrowed, whereby the buying target to be additionally purchased can be effectively searched.

In addition, as illustrated in FIG. 7, in the case where there are two or more types of betting types accepted from the user, when the betting type to be additionally purchased is specified depending on the comparison between the odds information in one type of betting type and the odds information in another type of betting type among the types of betting types, the betting types to be additionally purchased can be effectively narrowed down.

In addition, when the reference amount obtained from the SUM of the acceptance amounts is the amount less than the sum of the acceptance amounts by the allowable maximum amount (for example, the amount reduced by 5% of the total purchase amount, and the amount reduced based on the user's history), the additional purchase amount can be reduced.

In addition, when the allowable maximum amount is set by the user information of the user, the allowable maximum amount adapted to each user can be set depending on the user.

Incidentally, the terminal device 30 may perform the processes from step S1 to S9 by the application software.

In step S1, the terminal device 30 accepts the betting ticket purchase information such as the betting type of the betting ticket, the buying target in the betting type, and the amount for each buying target from the operating unit 34.

In step S2, the terminal device 30 acquires the information as to whether the race of the betting ticket is started from the betting ticket information provision server 10 to perform the determination.

In step S3, the terminal device 30 acquires the latest odds information from the betting ticket information provision server 10.

As in step S4, the terminal device 30 calculates the predicted payout amount obtained by multiplying the latest odds acquired from the betting ticket information provision server 10 by the purchase amount.

As in step S5, the terminal device 30 determines whether the predicted payout amount is less than the reference amount.

As in step S6, the terminal device 30 specifies the betting type and the buying target to be additionally purchased.

As in step S7, the terminal device 30 calculates the predicted payout amount of when the additional purchase for the purchase unit amount is performed.

As in step S8, the terminal device 30 determines whether the predicted payout amount is the reference amount after the additional purchase or more.

As in step S9, the terminal device 30 generates the information to be notified to the user to display the information to be notified to the user on the display unit 33.

When the additional purchase is performed, the terminal device 30 transmits the additional purchase information to the betting ticket information provision server 10.

Even when the terminal device 30 performs a series of processing by the betting ticket information provision server 10, the same effect can be obtained.

Further, the present invention is not limited to the above embodiment. The above embodiment is illustrative, and anything having components substantially identical to the technical idea described in the claims of the present invention and providing similar functions and effects is included in the technical scope of the present invention.

EXPLANATION OF REFERENCE NUMERALS

1 betting ticket information provision system.
10 betting ticket information provision server (betting ticket information provision device)
12*a* race information DB
12*b* purchase betting ticket DB
30 terminal device (betting ticket information provision device)

The invention claimed is:

1. A computer architecture comprising:
   at least one memory configured to store computer program code; and
   at least one processor configured to access said at least one memory, read said computer program code, and operate as instructed by said computer program code, said computer program code including:
   odds information acquisition code configured to cause at least one of said at least one processor to acquire odds information for a race from among a plurality of races;
   acceptance code configured to cause at least one of said at least one processor to accept from a user a user specified betting type for a betting ticket, the user specified betting type designating one or more racers out of a plurality of racers participating in the race, user specified one or more buying targets within the user specified betting type, and a user specified purchase amount for each of the one or more buying targets; and
   calculation code configured to cause at least one of said at least one processor to calculate a predicted payout amount for each of the user specified buying targets based on odds information for the buying target from the acquired odds information and the user specified purchase amount of the buying target; and
   output code configured to cause at least one of said at least one processor to, when at least one predicted payout amount out of the plurality of calculated predicted payout amounts is less than a reference amount that is a sum of the user specified purchase amount for each buying target, output information to be notified to the user including the buying target corresponding to the at least one predicted payout amount that is less than the reference amount,
   wherein when the user chooses to purchase the buying target for the additional purchase amount, a pre-set purchase unit amount of the buying target is iteratively purchased until the updated predicted payout amount for the buying target is greater than or equal to the sum of the reference amount and the additional purchase amount, and the information to be notified to the user includes the betting type, the buying target, and the additional purchase amount.

2. The computer architecture according to claim 1, wherein the information to be notified to the user includes additional purchase amount, wherein purchasing the additional purchase amount of the buying target would result in an updated predicted payout amount for the buying target that is greater than or equal to a sum of the reference amount and the additional purchase amount.

3. The computer architecture according to claim 2, wherein the reference amount added with the additional purchase amount is calculated from an addition amount of the sum of the acceptance amounts and an amount obtained by multiplying the number of buying targets to have the predicted payout amount less than the reference amount in the betting type by a purchase unit amount of the betting ticket, and the buying target to be additionally purchased is specified from buying targets to have the predicted payout amount less than the reference amount added with the additional purchase amount.

4. The computer architecture according to claim 2, wherein when there are two or more user specified types of the betting types, the betting type to be additionally purchased is specified depending on a comparison between odds information in one type of betting type and odds information in another type of betting type out of types of the betting types.

5. The computer architecture according to claim 1, wherein the reference amount is less than an allowable maximum amount.

6. The computer architecture according to claim 5, wherein the allowable maximum amount is set based on user information of the user.

7. A method performed by a computer, the method comprising:
   acquiring odds information for a race from among a plurality of races;
   accepting from a user a user specified betting type for a betting ticket, the user specified betting type designating one or more racers out of a plurality of racers participating in the race, user specified one or more buying targets within the user specified betting type, and a user specified purchase amount for each of the one or more buying targets;
   calculating a predicted payout amount for each of the user specified buying targets based on odds information for the buying target from the acquired odds information and the user specified purchase amount of the buying target; and
   when at least one predicted payout amount out of the plurality of calculated predicted payout amounts is less than a reference amount that is a sum of the user specified purchase amount for each buying target, outputting information to be notified to the user including the buying target corresponding to the at least one predicted payout amount that is less than the reference amount, and wherein when the user chooses to purchase the buying target for the additional purchase amount, a pre-set purchase unit amount of the buying target is iteratively purchased until the updated predicted payout amount for the buying target is greater than or equal to the sum of the reference amount and the additional purchase amount, and the information to be notified to the user includes the betting type, the buying target, and the additional purchase amount.

8. A non-transitory computer-readable recording medium recording a program for-a betting ticket information provision, the program causing a computer to:
   acquire odds information for a race from among a plurality of races;
   accept from a user a user specified betting type for a betting ticket, the user specified betting type designating one or more racers out of a plurality of racers participating in the race, user specified one or more buying targets within the user specified betting type, and a user specified purchase amount for each of the one or more buying targets;
   calculate a predicted payout amount for each of the user specified buying targets based on odds information for the buying target from the acquired odds information and the user specified purchase amount of the buying target; and
   when at least one predicted payout amount out of the plurality of calculated predicted payout amounts is less than a reference amount that is a sum of the user specified purchase amount for each buying target, output information to be notified to the user including the buying target corresponding to the at least one predicted payout amount that is less than the reference amount, and
   wherein when the user chooses to purchase the buying target for the additional purchase amount, a pre-set purchase unit amount of the buying target is iteratively purchased until the updated predicted payout amount for the buying target is greater than or equal to the sum of the reference amount and the additional purchase amount, and the information to be notified to the user includes the betting type, the buying target, and the additional purchase amount.

* * * * *